(12) United States Patent
Koenck et al.

(10) Patent No.: US 8,860,850 B1
(45) Date of Patent: Oct. 14, 2014

(54) PHOTON-STARVED IMAGING SYSTEM

(75) Inventors: Steven E. Koenck, Cedar Rapids, IA (US); David W. Jensen, Marion, IA (US); Jaclyn A. Hoke, Cedar Rapids, IA (US); Shubha L. Kadambe, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 37 days.

(21) Appl. No.: 12/861,972

(22) Filed: Aug. 24, 2010

Related U.S. Application Data

(63) Continuation-in-part of application No. 12/586,934, filed on Sep. 30, 2009, now Pat. No. 8,396,310, and a continuation-in-part of application No. 12/570,528, filed on Sep. 30, 2009, now Pat. No. 8,446,503, and a continuation-in-part of application No. 11/805,510, filed on May 22, 2007, now abandoned.

(51) Int. Cl.
*H04N 5/217* (2011.01)
*H04N 5/225* (2006.01)

(52) U.S. Cl.
USPC ..................................... 348/241; 348/216.1

(58) Field of Classification Search
None
See application file for complete search history.

(56) References Cited

U.S. PATENT DOCUMENTS

| | | | |
|---|---|---|---|
| 5,665,959 A * | 9/1997 | Fossum et al. | 250/208.1 |
| 5,818,052 A * | 10/1998 | Elabd | 250/370.09 |
| 7,496,293 B2 * | 2/2009 | Shamir et al. | 396/333 |
| 8,072,589 B2 * | 12/2011 | Khurana | 356/237.1 |
| 2007/0257184 A1 * | 11/2007 | Olsen et al. | 250/208.1 |
| 2009/0190001 A1 * | 7/2009 | Cheimets | 348/231.99 |
| 2012/0104526 A1 * | 5/2012 | Olsen et al. | 257/432 |

* cited by examiner

*Primary Examiner* — Lin Ye
*Assistant Examiner* — John H Morehead, III
(74) *Attorney, Agent, or Firm* — Donna P. Suchy; Daniels M. Barbieri

(57) ABSTRACT

A method for low-light imaging may include, but is not limited to: detecting one or more photons via the least one photon-counting sensor; determining an orientation of at least one photon-counting sensor; and correlating data associated with the at least one photon-counting sensor with the orientation of the at least one photon-counting sensor. A system for low-light imaging may include, but is not limited to: one or more photon-counting sensors configured for detecting one or more photons via the least one photon-counting sensor; one or more inertial sensors; and at least one processing unit configured for: determining an orientation of at least one photon-counting sensor and correlating data associated with the at least one photon-counting sensor with the orientation of the at least one photon-counting sensor.

20 Claims, 18 Drawing Sheets

PHOTON-STARVED IMAGING SYSTEM

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, or for any and all parent, grandparent, great-grandparent, etc. applications of the Related Application(s)).

RELATED APPLICATIONS

The present application constitutes a continuation-in-part of and claims priority to U.S. patent application Ser. No. 11/805,510 filed May 5, 2007 on behalf of Koenck et al. entitled "Energy Efficient Processing Device" which is currently co-pending, or is an application of which a currently co-pending application is entitled to the benefit of the filing date.

The present application constitutes a continuation-in-part of and claims priority to U.S. patent application Ser. No. 12/570,528 filed Sep. 30, 2009 on behalf of Koenck et al. entitled "Imaging System" which is currently co-pending, or is an application of which a currently co-pending application is entitled to the benefit of the filing date.

The present application constitutes a continuation-in-part of and claims priority to U.S. patent application Ser. No. 12/586,934, filed Sep. 30, 2009 on behalf of Kadambe et al. entitled "Basis Learning for Sparse Image Representation and Classification and Low Data Rate Compression" which is currently co-pending, or is an application of which a currently co-pending application is entitled to the benefit of the filing date.

All subject matter of the Related Applications and of any and all parent, grandparent, great-grandparent, etc. applications of the Related Applications is incorporated herein by reference to the extent such subject matter is not inconsistent herewith.

BACKGROUND

Next-generation vision systems will seek to provide increased situational awareness and enable effective mission execution in conditions where there is either extremely low light, or essentially no light available, such as caves or the interior of a structure. If a target space were illuminated at or near $10^{-5}$ lux, which is well below the noise floor of the current state of the art night vision goggles, an imaging system capable of operation at that level could provide functional vision even when enemies equipped with the current-generation night vision systems are effectively blind.

SUMMARY

A method for low-light imaging may include, but is not limited to: detecting one or more photons via the least one photon-counting sensor; determining an orientation of at least one photon-counting sensor; and correlating data associated with the at least one photon-counting sensor with the orientation of the at least one photon-counting sensor.

A system for low-light imaging may include, but is not limited to: one or more photon-counting sensors configured for detecting one or more photons via the least one photon-counting sensor; one or more inertial sensors; and at least one processing unit configured for: determining an orientation of at least one photon-counting sensor and correlating data associated with the at least one photon-counting sensor with the orientation of the at least one photon-counting sensor.

BRIEF DESCRIPTION OF THE FIGURES

The numerous advantages of the disclosure may be better understood by those skilled in the art by reference to the accompanying figures in which FIG..

DETAILED DESCRIPTION

Figure 1:
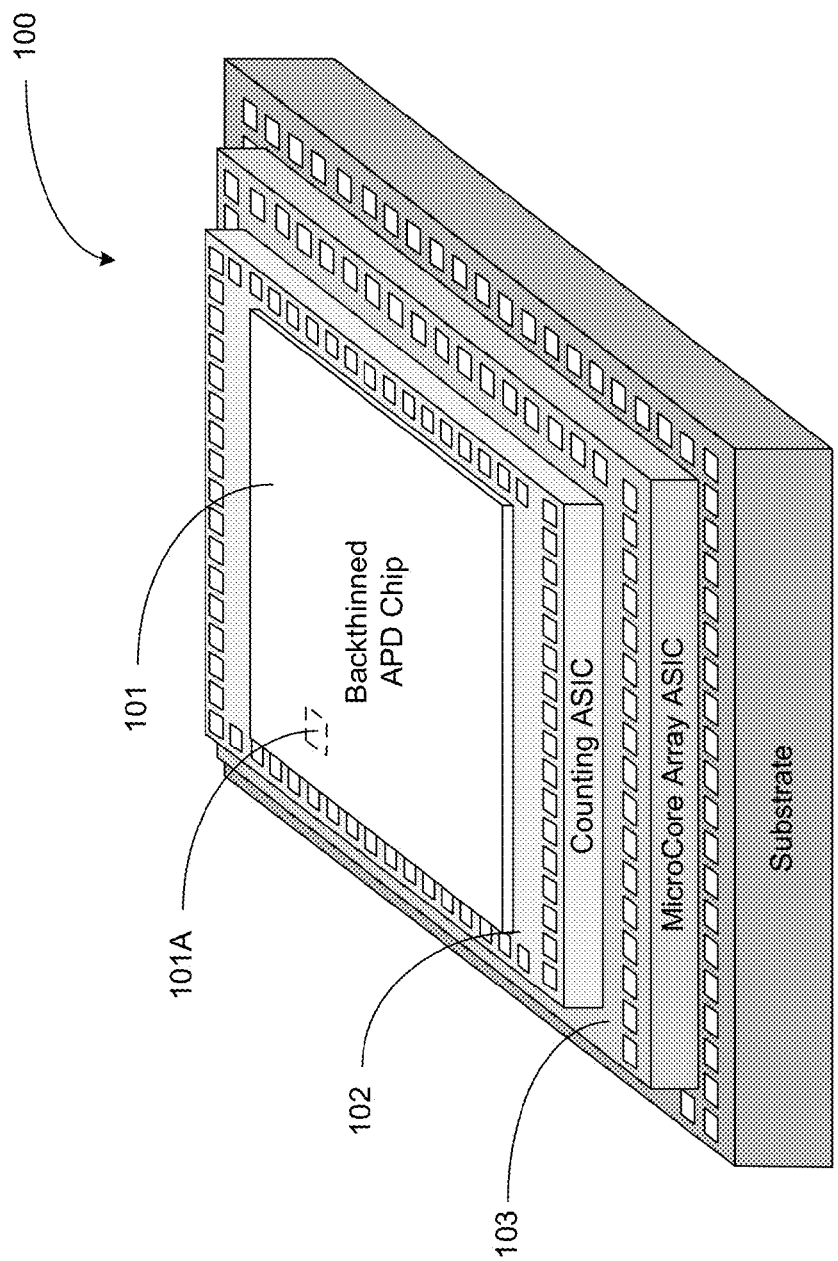
FIG. 1 illustrates a photon-counting sensor.
Figure 2:
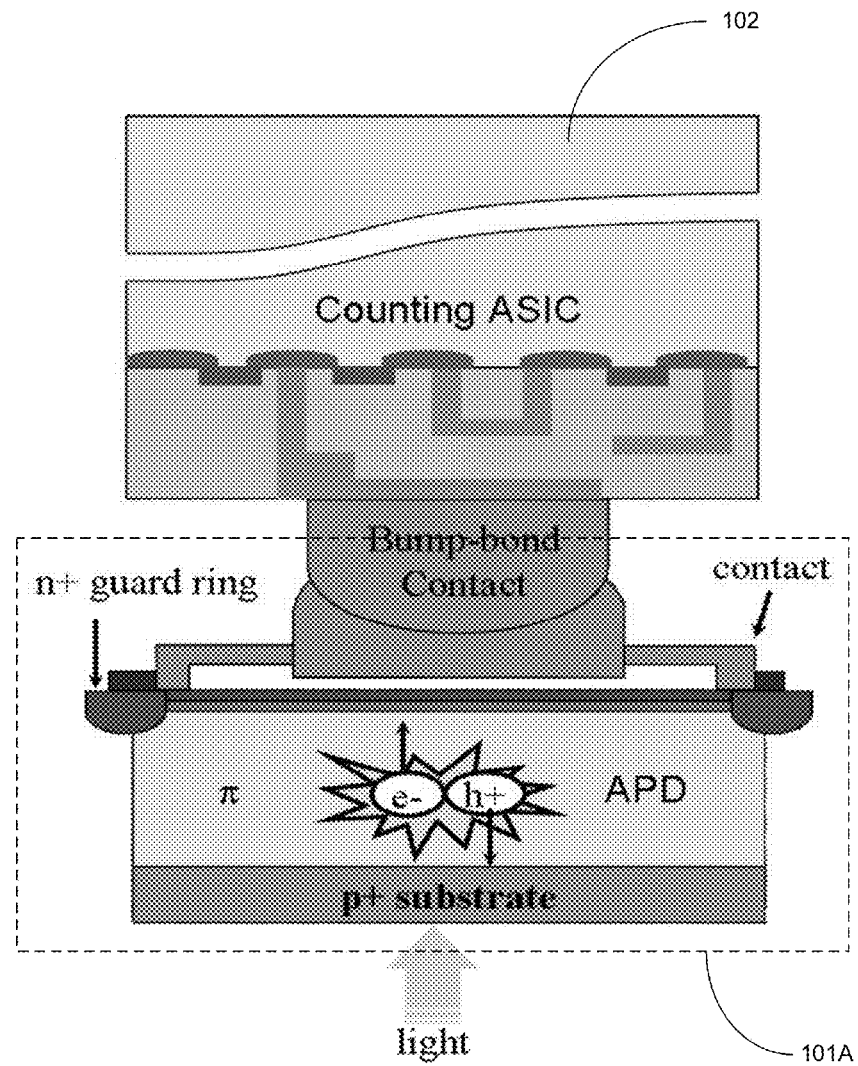
FIG. 2 illustrates a schematic cross-section representation of a photon-counting sensor pixel.

Referring to FIGS. 1-2, a photon-counting sensor 100 for high-sensitivity imaging is illustrated. While light has properties of both a wave as well as a particle, the light "particle" is called a photon. The ultimate low light sensitivity is detection and counting of individual photons. Prior art methods for detection and counting of individual photons typically require cryogenic cooling of the detection apparatus to mitigate the effects of thermal noise. This cooling requirement with its associated size and power consumption is generally acceptable for relatively large platforms such as military aircraft, but is problematic for small footprint applications such as miniature unmanned aerial vehicles (UAVs) or dismounted soldiers. A method and system for uncooled solid-state photon counting is described in U.S. patent application Ser. No. 12/570,528 filed Sep. 30, 2009 on behalf of Koenck et al. entitled "Imaging System".

In an exemplary embodiment, the photon-counting sensor 100 may include one or more stacked integrated circuits. The photon-counting sensor 100 may be a solid-state uncooled low-light sensor utilizing thresholded avalanche photodiode (APD) pixels. The photon-counting sensor 100 may be a two-chip hybrid including an array 101 of backside thinned APD pixels 101A bump bonded to one or more CMOS integrated circuits. Incident photons may be received, detected and counted with extremely low latency.

The photon-counting sensor 100 comprises a semiconductor substrate, an avalanche gain structure, an electrical connection to a detection circuit, and a digital counter. Incident photons with wavelengths between 200-1000 nm create a photoelectron that is amplified by avalanche gain to generate a "burst" of electrons that may be detected by an analog comparator connected to a digital counting ASIC 102 as illustrated in FIG. 2. The digital counting ASIC 102 may include a digital counter for each APD pixel 101A to serve the dual purposes of analog to digital conversion and integration of a received signal over time.

The APD pixel 101A coupled with an analog comparator may detect individual photons in the visible to near infrared spectrum. The APD pixel 101A may be biased to operate in a linear gain mode with a gain of about 100 to 200. When a photon arrives, a photoelectron may be generated. The photoelectron may be directed by a bias voltage toward the avalanche photodiode junction, where it may be accelerated by the high static electric field in the junction. The high velocity electron collides with atoms in the junction region, causing impact ionization action that generates a burst of approximately 100-200 additional electrons. This burst of electrons is accumulated in the capacitive charge storage of the signal node and is detected by an analog comparator, whose output is coupled to a digital counter circuit. Each pixel in the image sensor may be provided with a comparator and counter, which serves the dual functions of effective analog to digital conversion and signal integration.

The system 100 may include an energy-efficient parallel multicore image processor 103. The image processor 103 may include one or more instances of an energy efficient microcoded processor as described more fully in U.S. patent application Ser. No. 11/805,510 filed May 5, 2007 by Koenck et al. entitled "Energy Efficient Processing Device" incorporated herein by reference to the extent such subject matter is not inconsistent herewith. Various algorithms may be executed on the parallel multicore image processor to exploit the strengths of these elements and compensate for individual weaknesses to provide enhanced vision capability. For example, the image processor 103 may provide image enhancement processing such as that described more fully in U.S. patent application Ser. No. 12/570,528 filed Sep. 30, 2009 on behalf of Koenck et al. entitled "Imaging System" incorporated herein by reference to the extent such subject matter is not inconsistent herewith.

Figure 3:
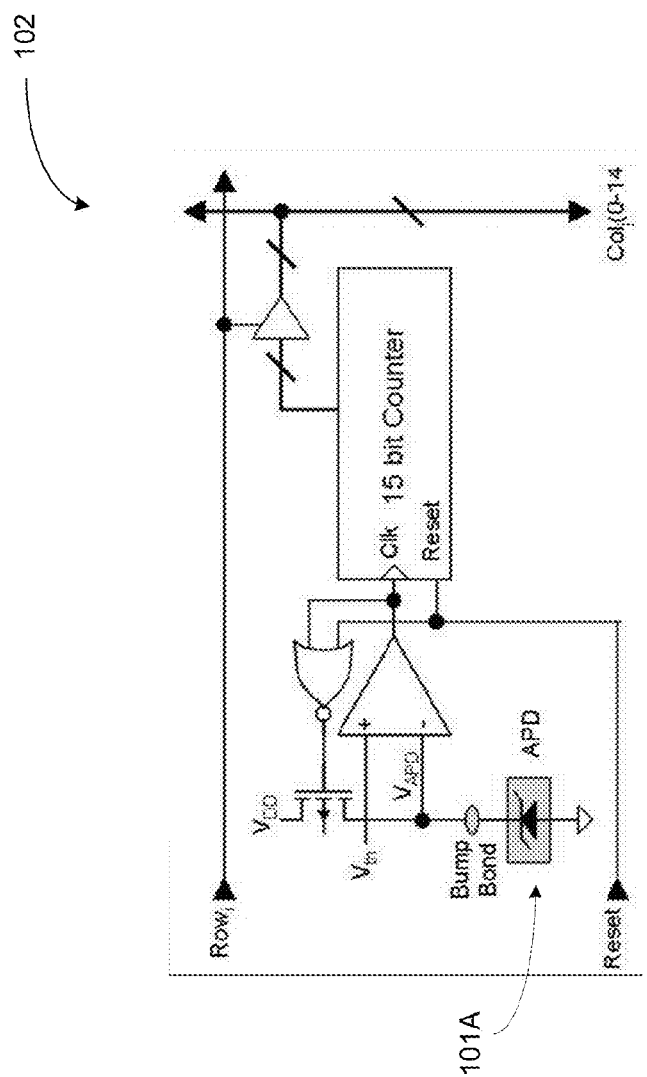
FIG. 3 illustrates a schematic representation of the electrical circuitry used to interface to a photon-counting sensor.

Referring to FIG. 3, a schematic diagram of a portion of the digital counting ASIC 102 is illustrated. Each APD pixel 101A of the photon-counting sensor 100 may be connected to a dedicated digital counting ASIC 102.

An APD pixel 101A operating in photon-starved illumination conditions may receive less than one photon per frame in video imaging applications. For example, a 10 μm×10 μm pixel may receive only 1 to 2 photons per second in $10^{-6}$ lux illumination conditions. As such, in photon-starved illumination conditions, it may be necessary to acquire photons from a scene over an extended period of time. In a case where a user and scene are not moving, ordinary image stabilization techniques may generally be capable of capturing images. However, users may desire a degree of mobility.

Figure 4:
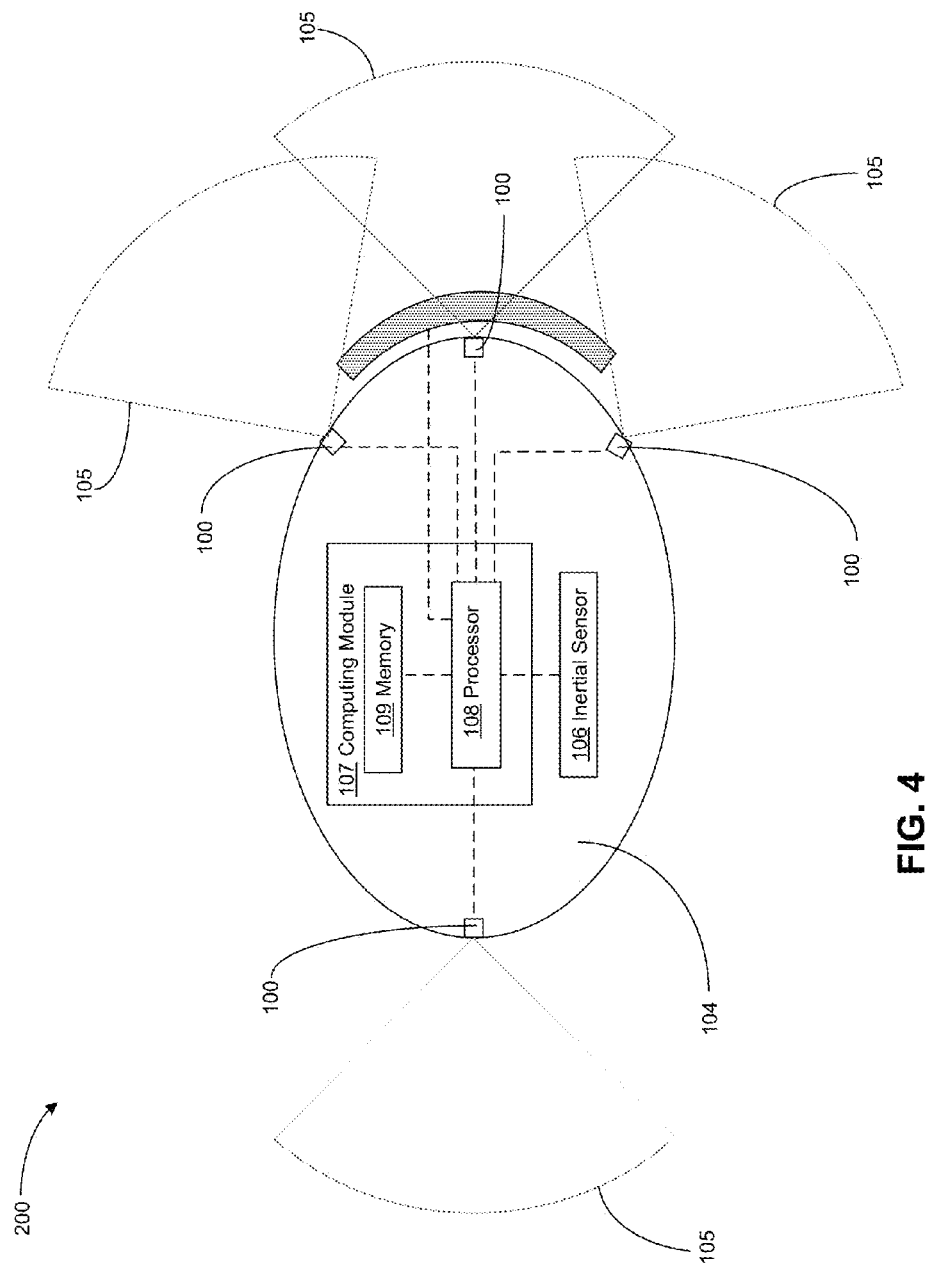
FIG. 4 illustrates a low-light imaging and display system.

Referring to FIG. 4, a system 200 for low-light imaging is shown. The system may include at least one photon-counting sensor 100 mounted to a supporting apparatus (e.g. a helmet 104, vehicle turret, etc.). Each photon-counting sensor 100 may have an associated field-of-view 105. The system 200 may further include an inertial sensor 106 (e.g. an accelerometer, gyroscope, etc.) configured to determine an orientation of a line of sight of a user wearing the helmet 104. The system 200 may further include a computing module 107 configured to receive signals from a photon-counting sensor 100 and the inertial sensor 106. The computing module 107 may include a processor 108 and memory 109. The system 200 may include a transmissive display 110 (e.g. a heads up display mounted to an infantry helmet) which may receive image display data from the computing module 107 generated according to the outputs of the photon-counting sensor 100 and the inertial sensor 106.

In order to enable longer integration times while accounting for movement of a user, registration of data between separate photon-counting sensors 100 across multiple frames may be required.

Figure 5:
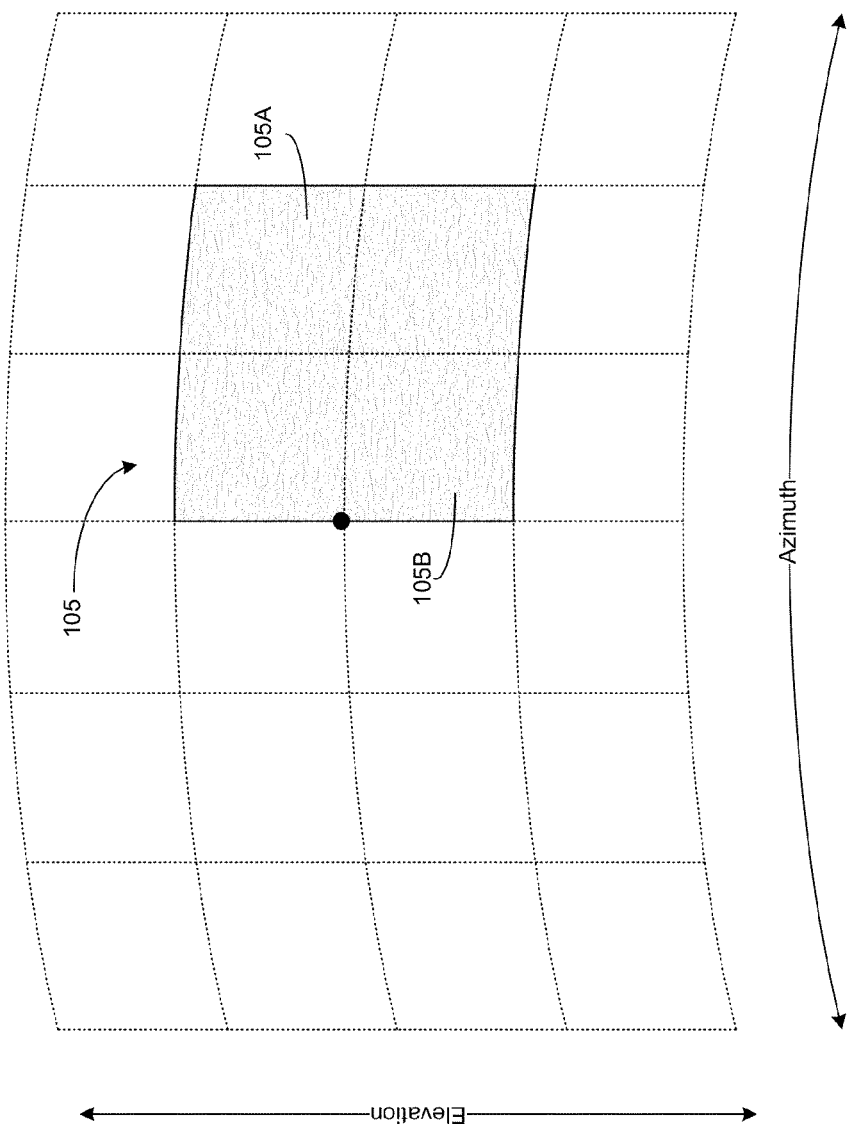
FIG. 5 illustrates a field-of-view of a photon-counting sensor.

Referring to FIG. 5, a field-of-view 105 of a photon-counting sensor 100 is shown. Portions of the field-of-view 105 (e.g. field-of-view portion 105A and field-of-view portion 105B) may be associated with a particular azimuth angle/elevation angle pair relative to a reference point 111 established by the system 200 at initialization. Photons received by the photon-counting sensor 100 (or the individual APD pixels 101A thereof) from the respective field-of-view portions 105 may be mapped to those portions by the system 200 as described below.

Following is a description of a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

FIGS. 6, 7, 9, 12-14 and 16 illustrate operational flows representing example operations related to low-light imaging. In FIGS. 6, 7, 9, 12-14 and 16 that include various examples of operational flows, discussion and explanation may be provided with respect to the above-described examples of FIGS. 1-5, 8, 10, 11, and 15A-15C and/or with respect to other examples and contexts. However, it should be understood that the operational flows may be executed in a number of other environments and contexts, and/or in modified versions of FIGS. 6, 7, 9, 12-14 and 16. In addition, although the various operational flows are presented in the sequence(s) illustrated, it should be understood that the various operations may be performed in other orders than those that are illustrated, or may be performed concurrently.

Figure 6:
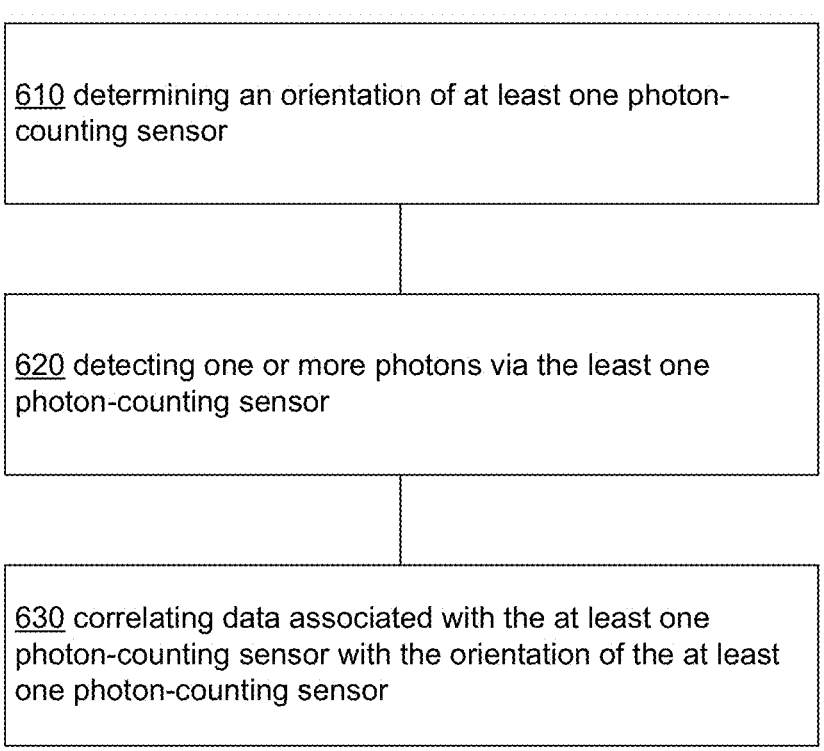
FIG. 6 illustrates a high-level process flow diagram for a method for low-light imaging and display.

Referring to FIG. 6, operation 610 depicts determining an orientation of at least one photon-counting sensor. For example, the inertial sensor 106 may provide data regarding its orientation to the processor 108. The orientation may be characterized by azimuth and elevation angles with respect to a reference point as determined by the inertial sensor 106. The orientation may also include rotation about an axis normal to the surface of the photon-counting sensors 100. The processor 108 may correlate the orientation data with known physical configuration parameters (e.g. the spatial separations and relative directions of the photon-counting sensors 100 as configured on a helmet 104) to determine what portions of the 3-dimensional viewing space surrounding the system 200 are within the field-of-view 105 of a photon-counting sensor 100.

Operation 620 depicts detecting one or more photons via the least one photon-counting sensor. For example, the photon-counting sensor 100 may receive one or more photons from the ambient environment within its field-of-view 105 that may be counted by the digital counting ASIC 102. Typical prior art low-light imaging systems may be capable of operating at light levels as low as about $10^{-4}$ lux. The ambient light conditions detectable by the photon-counting sensor 100 may be at levels well below these capabilities (e.g. below about $10^{-5}$ lux). Data regarding the number of photons detected by the digital counting ASIC 102 may be provided to the processor 108. Various image enhancement operations may be applied to the photon-counting data obtained by the photon-counting sensor 100, such as those described more fully in U.S. patent application Ser. No. 12/570,528.

Operation 630 depicts correlating data associated with the at least one photon-counting sensor with the orientation of the at least one photon-counting sensor. A detected photon may be geo-referenced to a location within the 3-dimensional viewing space surrounding the system 200 based on the orientation of the field-of-view 105 of the receiving photon-counting sensor 100. The processor 108 may correlate the data received from the photon-counting sensor 100 (e.g. a number of photons detected during a frame) with data associated with the orientation of the photon-counting sensor 100 (or the individual APD pixels 101A within the photon-counting sensors 100) (as determined from data received from the inertial sensor 106) by storing the data in a location in memory 109 associated with the orientation. For example, if the computing module 107 determines that a given photon-counting sensor 100 has an orientation characterized by a given azimuth/elevation pair, the data received from the photon-counting sensor 100 while at that orientation may be saved to a database field associated with the azimuth/elevation pair.

Where system 200 employs multiple photon-counting sensors 100, the relative orientations of each photon-counting sensor 100 may be monitored simultaneously such that data indicative of photons received by each photon-counting sensor 100 can be stored to a location in memory 109 associated with that orientation. As such, the system 200 may record a wide field of view (e.g. 2×pi steradians). Such configurations allow for the recording of portions outside of a field-of-view 115 of a user 114 so that, upon movement of the user 114 which alters the field-of-view 115, an image may be provided to the user 114 which includes data indicative of photons previously received within the altered field-of-view 115.

Figure 7:
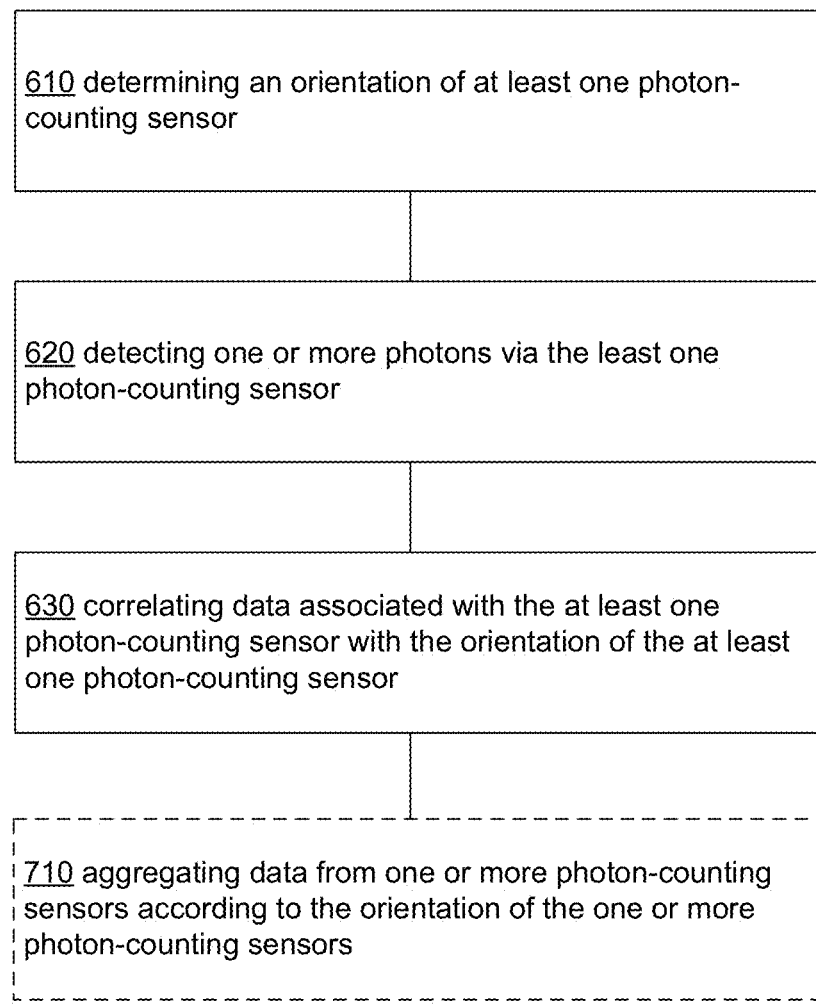
FIG. 7 illustrates a high-level process flow diagram for a method for low-light imaging and display.

Referring to FIG. 7, operation 710 depicts aggregating data from one or more photon-counting sensors according to the orientation of the one or more photon-counting sensors. Shown in FIG. 8

Figure 8A:
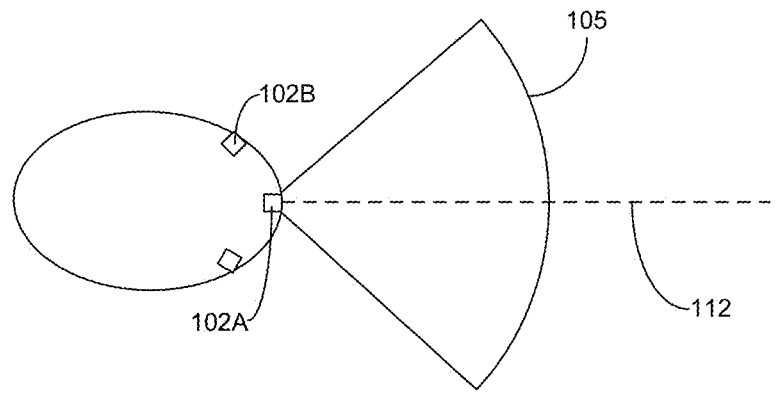
FIG. 8 illustrates various orientations of the low-light imaging and display system.
Figure 8B:
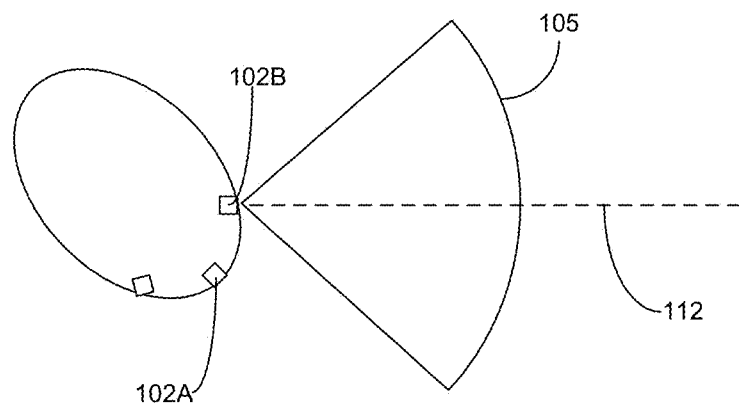

The signals of one or more photon-counting sensors 100 may be sampled at regular intervals so as to form data representing one or more image frames. The sampling rate may be about 60 Hz. The signals from photon-counting sensors 100 having a particular orientation may be aggregated (e.g. summed) with those previously stored in memory 109 at the location associated with that orientation. For example, the aggregation may include: shown in FIG. 8A, detecting a first photon via a first photon-counting sensor 100A having a first orientation 112 and storing data associated with the receipt of the first photon in a location in memory 109 associated with the first orientation 112; and, again as shown in FIG. 8A, receiving a second photon via the first photon-counting sensor 100 having the first orientation 112 and storing data associated with the receipt of the second photon in the location in memory 109 associated with the first orientation 112. Alternately, the aggregation may include: as shown in FIG. 8A, receiving a first photon via a first photon-counting sensor 100A having a first orientation 112 and storing data associated with the receipt of the first photon in a location in memory 109 associated with the first orientation 112; and, shown in FIG. 8B, receiving a second photon via a second photon-counting sensor 100B having the first orientation 112 (e.g. following rotation of the helmet 104) and storing data associated with the receipt of the second photon in a location in memory 109 associated with the first orientation 112. To avoid saturation, data may be added and removed from the location in memory 109 associated with the orientation in a first-in-first-out manner where only a threshold number of data points are aggregated at any one time.

Figure 9:
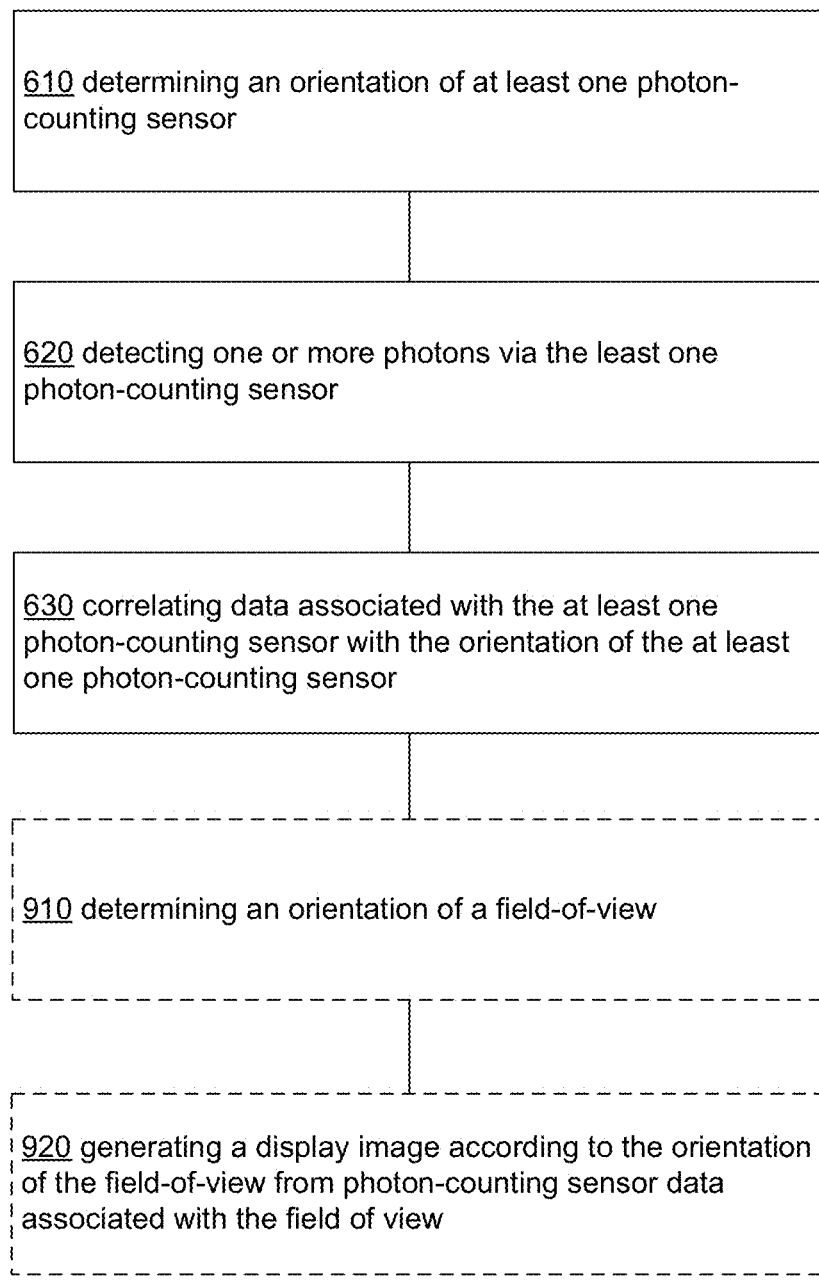
FIG. 9 illustrates a high-level process flow diagram for a method for low-light imaging and display.
Figure 10:
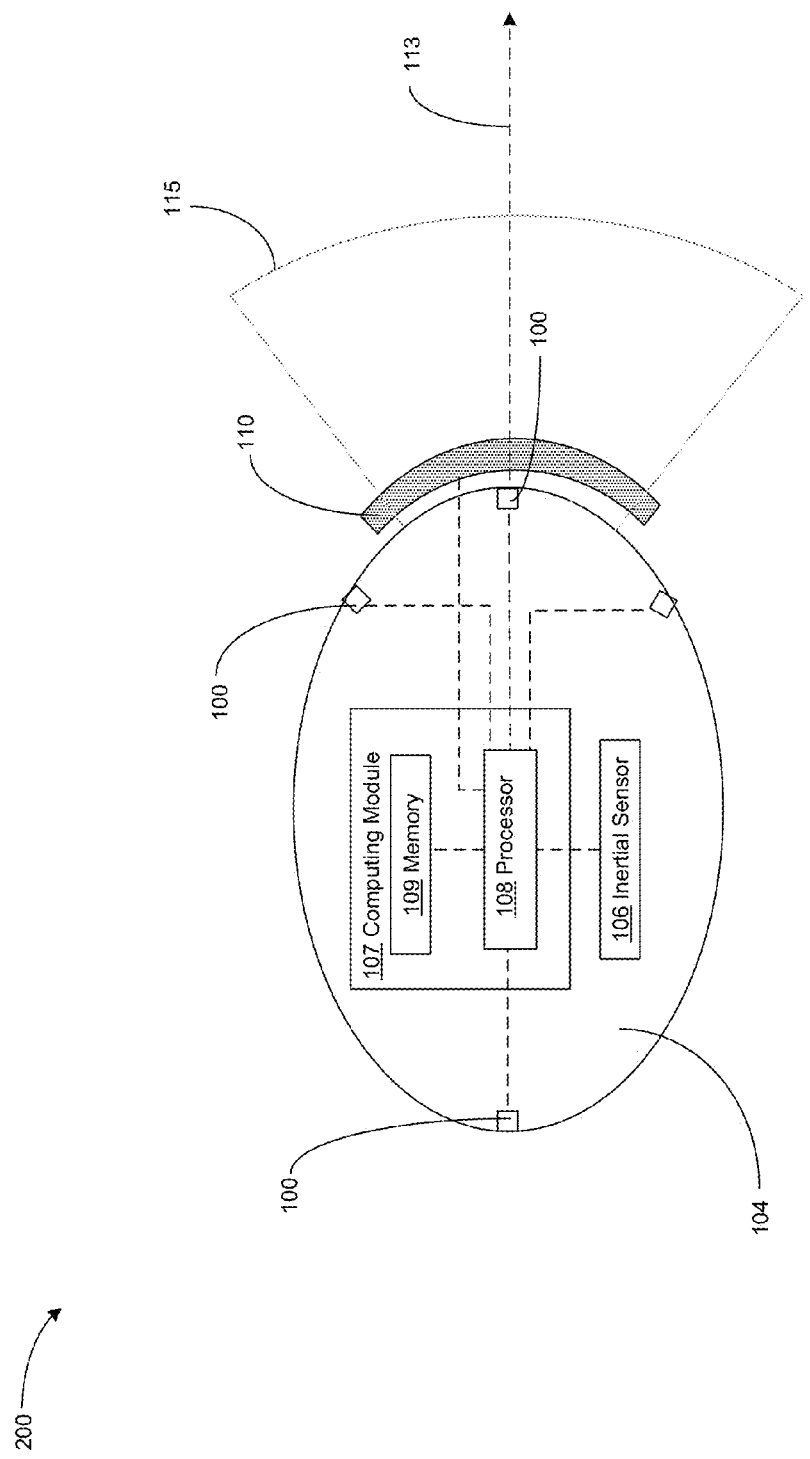
FIG. 10 illustrates a low-light imaging and display system.

Referring to FIG. 9, operation 910 depicts determining an orientation of a field-of-view. For example, the inertial sensor 106 may provide data regarding its orientation to the processor 108. The orientation may be characterized by azimuth and elevation angles with respect to a reference point as determined by the inertial sensor 106. Referring to FIG. 10, the processor 108 may correlate the orientation data with known physical configuration parameters of the system 200 (e.g. the orientation of the line-of-sight 113 of a user 114 when wearing helmet 104) to determine what portions of the 3-dimensional viewing space surrounding the system 200 are within a field-of-view 115 of the user 114.

Figure 11:
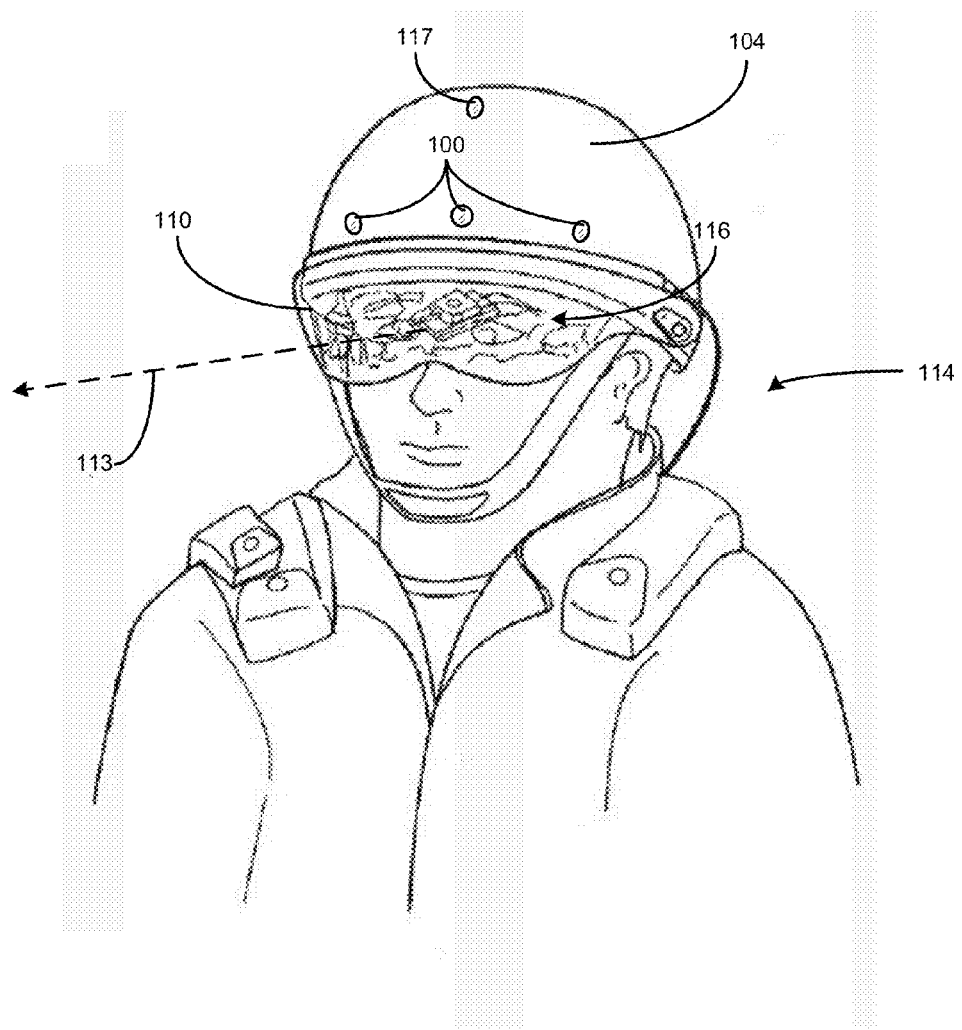
FIG. 11 illustrates a low-light imaging and display system.

Referring again to FIG. 9, operation 920 depicts generating a display image according to the orientation of the field-of-view from photon-counting sensor data associated with the field of view. Referring to FIGS. 10-11, the processor 108 may retrieve data regarding photon detection from memory 109 according to data from the inertial sensor 106 and generate a corresponding display image 116. For example, when data from the inertial sensor 106 indicates that the helmet 104 is facing in a direction that includes a field-of-view 115 of a user 114, the processor 108 may retrieve aggregated photon detection data from locations in memory 109 associated with the current field-of-view 115. The aggregated data may be translated into image data that may be provided to a transmissive display 110 where the image data is presented as a viewable image 116. The elements of the viewable image 116 may correlate to data associated with photons previously detected from within the field-of-view 115 such that the viewable image overlays the actual geographic location of the light-emitting features previously sampled by the photon-counting sensor 100. Once an image has been generated, subsequent geo-referenced views of the static imagery may be rendered to the user 114.

Figure 12:
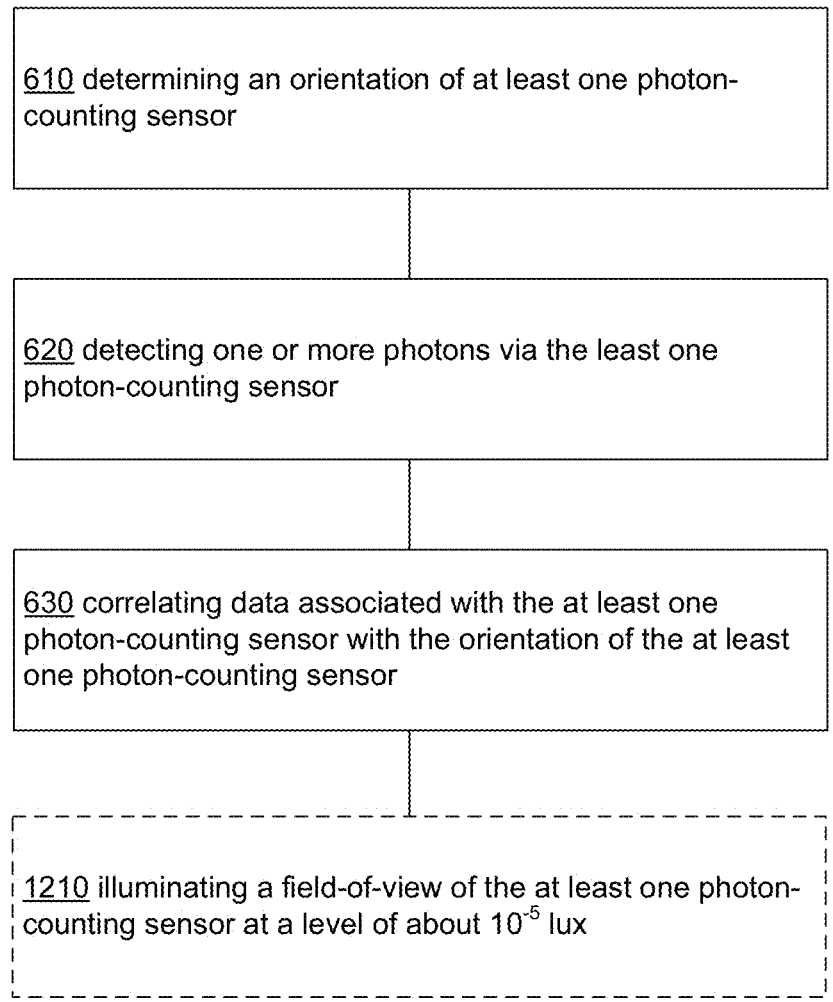
FIG. 12 illustrates a high-level process flow diagram for a method for low-light imaging and display.

Referring to FIG. 12, operation 1210 depicts illuminating a field-of-view of the at least one photon-counting sensor at a level of about $10^{-5}$ lux. As disclosed above, the ambient light conditions detectable by the photon-counting sensor 100 may be at levels below the capabilities of prior art low-light imaging systems (e.g. below about $10^{-5}$ lux). In cases where there is significantly less light available for imaging (e.g. absolute darkness), it may be necessary to illuminate the viewing environment to at least a threshold detection level of the photon-counting sensor 100. The system 200 may include a light source 117 configured to emit light at levels of about $10^{-5}$ lux so as to enable the system 200 to image the surrounding environment while still remaining below the threshold imaging levels of prior art low-light imaging systems. Alternately, the light source 117 may be independent of the system (e.g. mounted to a weapon or hand-held).

Figure 13:
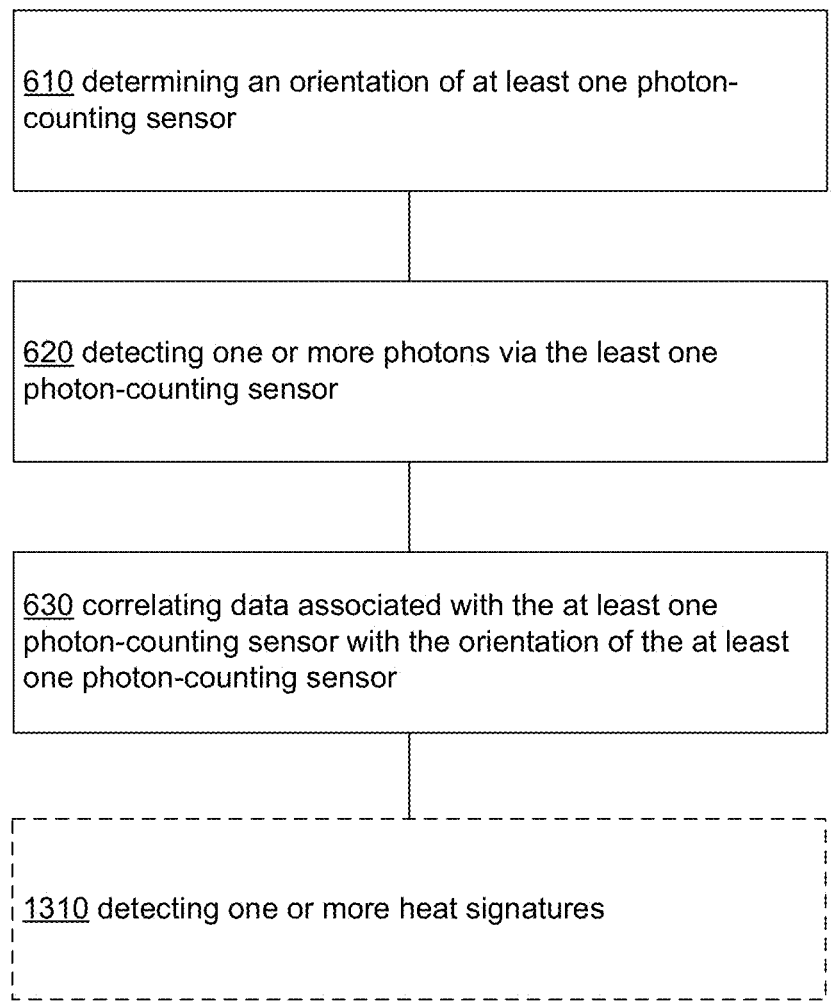
FIG. 13 illustrates a high-level process flow diagram for a method for low-light imaging and display.

Referring to FIG. 13, operation 1310 depicts detecting one or more heat signatures. Due to the relatively long dwell times (e.g. 0.5-1.0 seconds) that may be required to receive sufficient photons to image an environment having ambient lighting below about $10^{-5}$ lux using the system 200, it may prove difficult to render moving objects in real time. As such, the system 200 may further include substantially real-time thermal imagery sensors. The thermal imagery sensors may detect a heat signature of an object (e.g. a human or animal). Data from the thermal imagery sensors may be provided to the processor 108 that may display a thermal image on the transmissive display 110. The thermal image may overlay the images of the static portions of the environment that have been generated from data produced by the photon-counting sensor 100.

Figure 14:
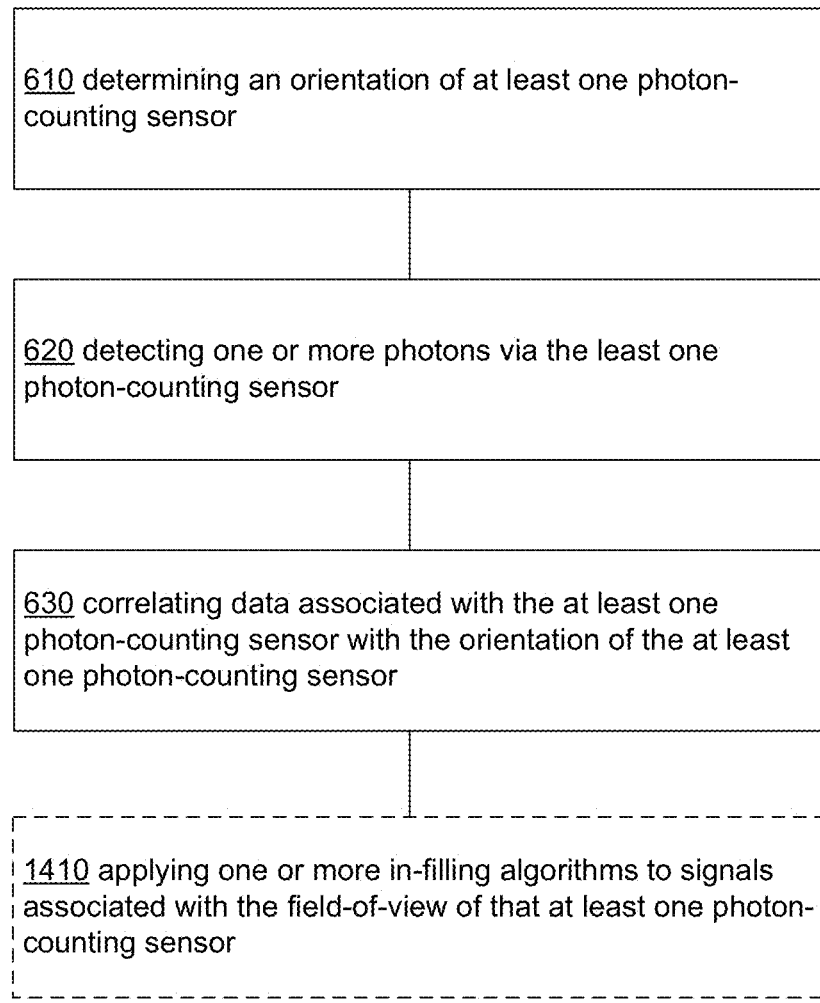
FIG. 14 illustrates a high-level process flow diagram for a method for low-light imaging and display.

Referring to FIG. 14, operation 1410 depicts applying one or more in-filling algorithms to signals associated with the field-of-view of that at least one photon-counting sensor. In-painting is an application of basis learning, the purpose of which is to fill in missing values without a priori knowledge of a noise distribution. A photon-starved image may be randomly missing 80-90% or more of the pixels (i.e. the pixel value is zero at those locations). In-painting may use a set of learned basis functions to estimate the missing pixels by interpolating known pixels.

A set of basis functions can be learned in-situ and can be used in information acquisition and rendering. The information acquisition using this learned set of basis functions leads to a sparse sampling method (below the Nyquist rate) to acquire information in non-ideal sampling environments. The process of learning a basis set uses a statistical approach and estimation. Since a set of basis functions can be learned or trained in-situ, there is no need for a separate large training database for all types of images of interest.

A photon-counting sensor 100 operating in photon-starved illumination conditions will typically receive far less than one photon per frame in video imaging applications. For example, a 10 µm×10 µm pixel will typically receive only 1 to 2 photons per second in $10^{-6}$ lux illumination conditions. The basis learning approach represents the statistical behavior of photon arrival optimally using a set of basis functions. These basis functions can then be used to estimate ideal (non-sparse) images.

Additional significant advantages of this approach include joint compression and classification, noise reduction, and in-painting. Basis learning and its application to sparse representation of images is described in U.S. patent application Ser. No. 12/586,934, which is incorporated herein by reference in its entirety to the extent not inconsistent herewith.

Figure 15A:
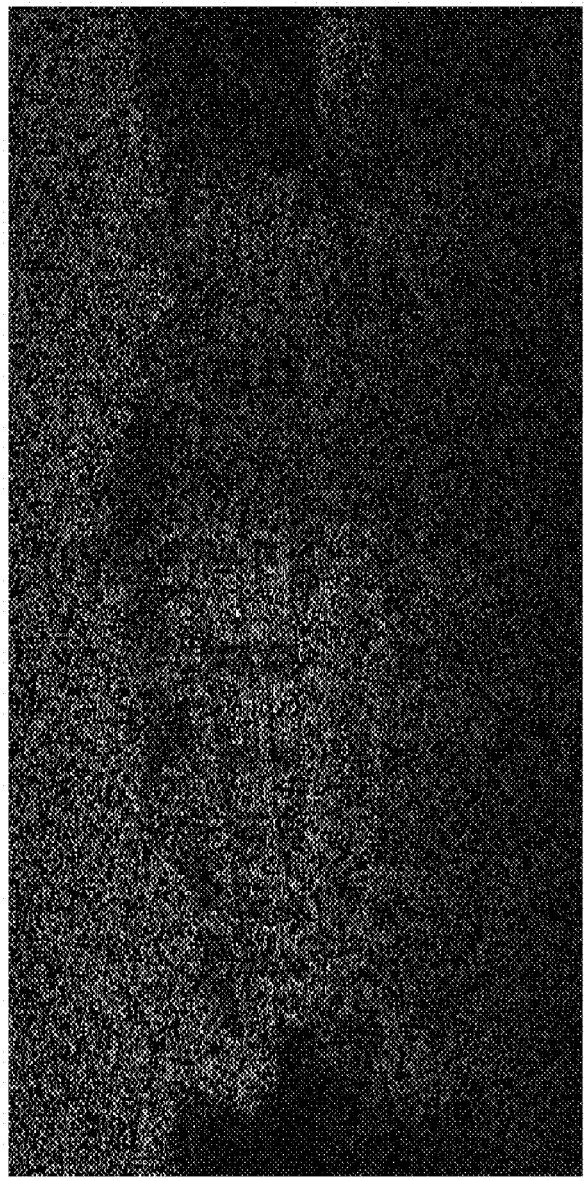
FIG. 15A illustrates an image having missing pixels.
Figure 15B:
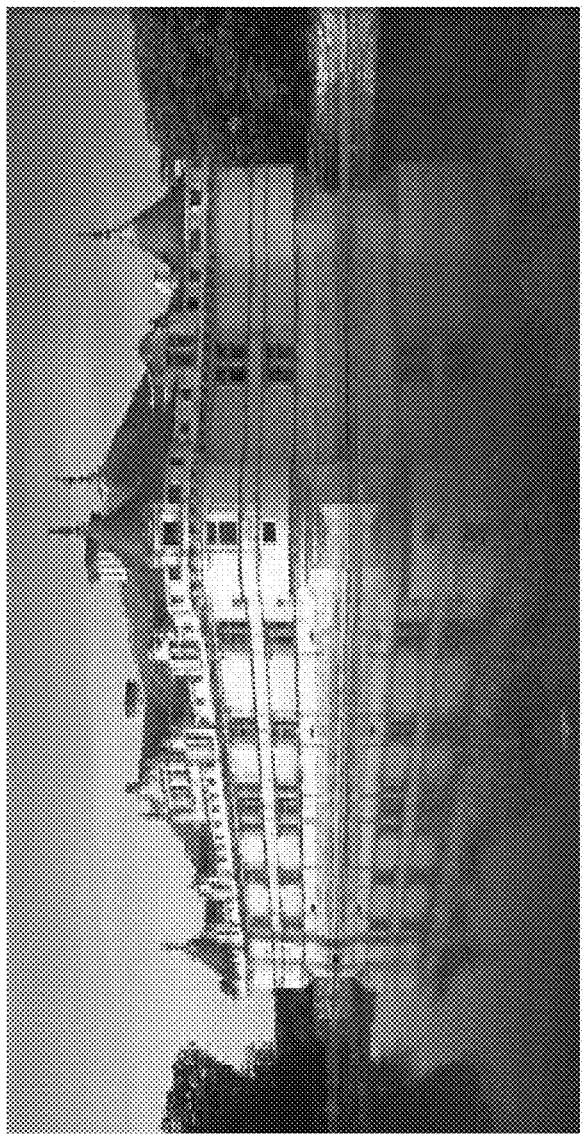
FIG. 15B illustrates an image following in-filling operations.
Figure 15C:
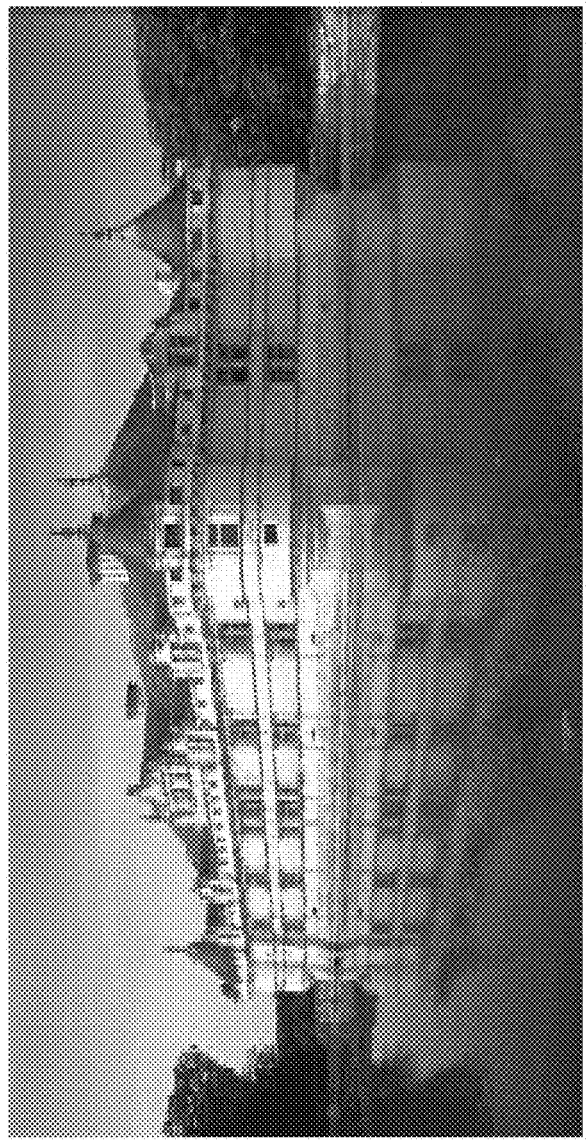
FIG. 15C illustrates an original image.

Results from an exemplary in-painting algorithm are shown in FIGS. 15A-15C. FIG. 15A shows a test image where approximately 80% of the image pixels are missing. FIG. 15B shows a resultant image following 64 rounds of in-painting. FIG. 15C shows the original image.

Figure 16:
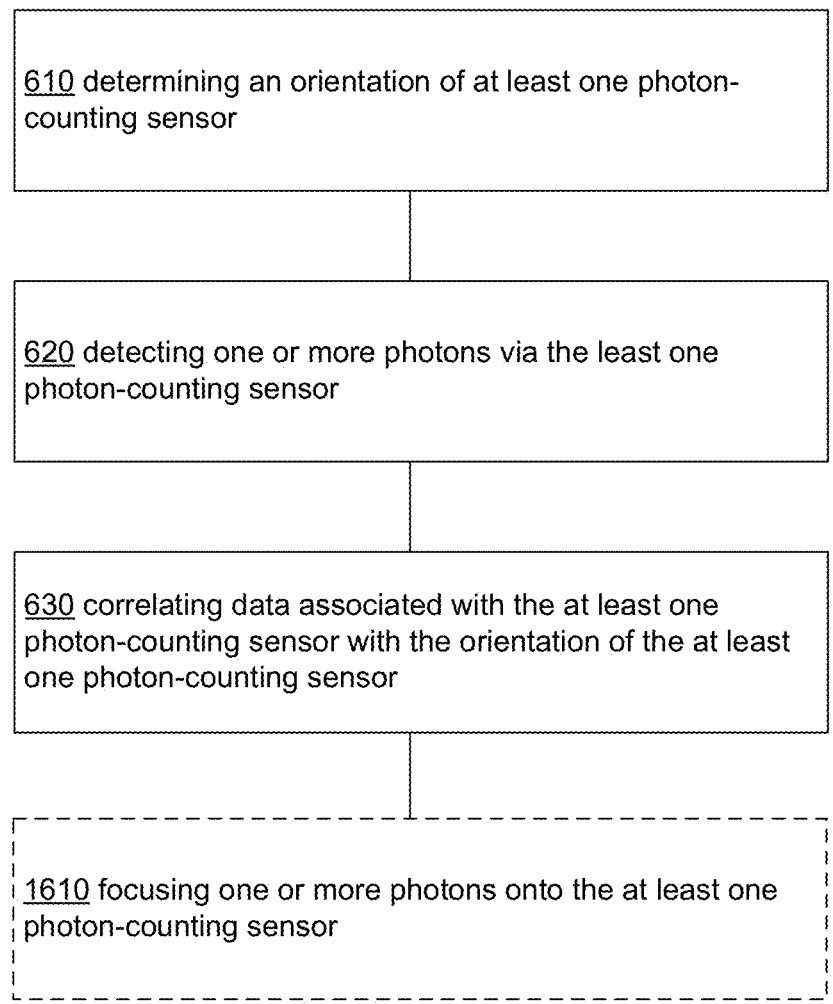
FIG. 16 illustrates a high-level process flow diagram for a method for low-light imaging and display.

Referring to FIG. 16, operation 1610 depicts focusing one or more photons onto the at least one photon-counting sensor. It may be the case that a single photon may be focused across multiple APD pixels 101A of the photon-counting sensor 100 and the sub-photon level of energy may not rise to a level that can be measured. As such, the system may employ focusing optics (e.g. a microlens array) to focus incident photons onto single APD pixels 101A. Alternately, substrate guided optics (SGOs) may be employed to focus incident photons. SGO may include materials which have non-constant refractive indices to overcome Lagrange invariant and étendue properties of optical systems that characterize the dispersion of light in area and angle.

In the present disclosure, the methods disclosed may be implemented as sets of instructions or software readable by a device embodied in a tangible media, such as memory. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method for low-light imaging, comprising:
   determining that a first photon-counting sensor is oriented at a first orientation;
   detecting one or more photons via the first photon-counting sensor when the first photon-counting sensor is oriented in the first orientation;
   determining that a second first photon-counting sensor is oriented in the first orientation while the first photon-counting sensor is oriented in a second orientation different than the first orientation;
   detecting one or more photons via the second photon-counting sensor when the second photon-counting sensor is in the first orientation; and
   aggregating data generated by the first photon-counting sensor when the first photon-counting sensor is in the first orientation with data generated by the second photon-counting sensor when the second photon-counting sensor is in the first orientation.

2. The method of claim 1, further comprising:
   determining an orientation of a field-of-view of a user; and
   generating a display image according to the orientation of the field-of-view of the user from aggregated photon-counting sensor data corresponding to the orientation of the field-of-view of the user.

3. The method of claim 1, wherein determining that a photon-counting sensor is oriented in an orientation includes:
   querying an inertial sensor.

4. The method of claim 1, further comprising:
   illuminating a field-of-view of at least one photon-counting sensor at a level at or below $10^{-5}$ lux.

5. The method of claim 1, further comprising:
   detecting one or more heat signatures.

6. The method of claim 5, further comprising:
   generating a display image including one or more image elements representing aggregated photon-counting sensor data superimposed with one or more image elements associated with the one or more heat signatures.

7. The method of claim 1, further comprising:
   applying one or more in-filling algorithms to signals associated with a field-of-view of the at least one photon-counting sensor.

8. The method of claim 1, further comprising:
   generating a display image including image elements associated with an aggregated signal associated with a sub-field of view and in-filled image elements associated with a second sub-field of view.

9. The method of claim 1, further comprising:
   focusing one or more photons onto a particular photon-counting sensor of the at least one photon-counting sensor.

10. A system for low-light imaging, comprising:
    a first photon-counting sensor;
    a second photon-counting sensor;
    one or more inertial sensors; and
    at least one processing unit configured for:
      determining that a first photon-counting sensor is oriented at a first orientation via the one or more inertial sensors;
      detecting one or more photons via the first photon-counting sensor when the first photon-counting sensor is oriented in the first orientation;
      determining that a second first photon-counting sensor is oriented in the first orientation while the first photon-counting sensor is oriented in a second orientation different than the first orientation;
      detecting one or more photons via the second photon-counting sensor when the second photon-counting sensor is in the first orientation; and
      aggregating data generated by the first photon-counting sensor when the first photon-counting sensor is in the first orientation with data generated by the second photon-counting sensor when the second photon-counting sensor is in the first orientation.

11. The system of claim 10, further comprising;
    an image display device;
    wherein the at least one processing unit is further configured for:
      determining an orientation of a field-of-view of a user; and
      generating a display image according to the orientation of the field-of-view of the user from aggregated photon-counting sensor data corresponding to the orientation of the field-of-view of the user.

12. The system of claim 10, further comprising:
    at least one light source configured for illuminating a field-of-view of at least one photon-counting sensor at a level at or below $10^{-5}$ lux.

13. The system of claim 11, further comprising:
    one or more thermal imaging sensors configured for detecting one or more heat signatures.

14. The system of claim 13, wherein the at least one processing unit is further configured for:
    generating a display image including one or more image elements representing aggregated photon-counting sensor data superimposed with one or more image elements associated with the one or more heat signatures.

15. The system of claim 10, wherein the at least one processing unit is further configured for:
    applying one or more in-filling algorithms to signals associated with a field-of-view of the at least one photon-counting sensor.

16. The system of claim 15, wherein the at least one processing unit is further configured for:
    generating a display image including image elements associated with an aggregated signal associated with a sub-field of view and in-filled image elements associated with a second sub-field of view.

17. The system of claim 10, further comprising:
   focusing optics configured for focusing one or more photons onto a particular photon-counting sensor of the at least one photon-counting sensor.

18. The method of claim 1, wherein the detecting one or more photons via the first photon-counting sensor when the first photon-counting sensor is oriented in the first orientation comprises:
   detecting one or more photons via at least one solid-state, uncooled photon-counting sensor including one or more thresholded avalanche photodiode (APD) pixels.

19. The system of claim 10, wherein at least one photon-counting sensor includes:
   at least one solid-state, uncooled photon-counting sensor including one or more thresholded avalanche photodiode (APD) pixels.

20. The method of claim 1, wherein the aggregating data generated by the first photon-counting sensor when the first photon-counting sensor is in the first orientation with data generated by the second photon-counting sensor when the second photon-counting sensor is in the first orientation includes:
   summing data generated by the first photon-counting sensor when oriented in the first orientation with data generated by the second photon-counting sensor when oriented in the first orientation.

\* \* \* \* \*